May 19, 1970     T. SABEV     3,513,342
ROTOR FOR ALTERNATING-CURRENT MACHINES
Filed Feb. 3, 1966     3 Sheets-Sheet 1

United States Patent Office 3,513,342
Patented May 19, 1970

3,513,342
ROTOR FOR ALTERNATING-CURRENT MACHINES
Todor Sabev, Nuremberg, Germany, assignor, by mesne assignments, to Todor Sabev, Nuremberg, Germany
Filed Feb. 3, 1966, Ser. No. 524,728
Claims priority, application Germany, June 25, 1965, S 97,815; Feb. 6, 1965, S 95,347
Int. Cl. H02k 3/06, 17/16, 9/00
U.S. Cl. 310—211                                    19 Claims

ABSTRACT OF THE DISCLOSURE

A rotor for an alternating current machine comprises a ferromagnetic rotor body and ferromagnetic electrically conducting rods fixedly joined with the rotor body and providing a smooth rotor surface while preventing currents to flow in tangential direction. The ferromagnetic rods are in electrically conducting connection with each other at their axial ends. The rods are approximately trapezoidal in cross section and have a considerably smaller spatial expansion in tangential direction than in radial direction.

---

My invention relates to rotors for alternating-current machines preferably induction motors.

The stator windings of asynchronous machines, especially three-phase induction motors, when energized, produce sinusoidal electromagnetic waves in the air gap of the machine. The fundamental and upper harmonics of these electromagnetic waves form corresponding induction waves which induce currents in the rotor. The currents coact with the stator field to produce forces and force moments. If the rotor consists of massive ferromagnetic material, eddy currents are induced at its surface and cause great losses by heat generation. The eddy currents produce their own field whose penetrating depth in the rotor increases with decreasing frequency of the currents, the ratio of the penetrating depths being, for example, about 1:10 in the frequency ranges normally occurring in operation.

The presence of slot openings in the stator and the stepped ampere turns at the stator periphery cause the occurrence of field upper harmonics in the air gap. In a rotating rotor of massive ferromagnetic material, these pulsating field waves produce additional surface losses, although the penetrating depth of the field upper harmonics is very slight.

By reducing the width of semiclosed stator slots, the amplitude of the field upper harmonics can be reduced, but this is accompanied by an increased stator stray field resulting in a reduced power factor. For improving the power factor of conventional induction motors, the air gap is kept as narrow as feasible. With massive rotors, however, this expedient leads to increased surface losses.

The induced eddy currents have components in tangential directions (hereinafter called transverse currents), which have different frequencies and cause a distortion of the field distribution in the axial direction, as well as undesired force moments. The useful moments of the machine are essentially due to the axially directed current components of the fundamental wave; and these useful moments are detrimentally affected by the just-mentioned distortion in field distribution and additionally by moments caused in the axial direction by upper harmonic currents.

Asynchronous (induction) machines with ferromagnetic massive rotors of simple design without any winding are well known to have a few particularly favorable qualities, namely a high starting quality factor (starting torque), a quiet or virtually noiseless operation, and a cheaply producible rotor which is indestructible in operation.

However, such machines exhibit a larger amount of slip, a poorer degree of efficiency, a lower power factor in continuous operation, and also an only slight overloadability, as compared with machines of the standard type having laminated squirrel-cage rotors. Attempts have been made toward eliminating these disadvantages, for example by milling narrow and deep longitudinal grooves and transverse grooves into the massive rotors. Most of the known attempts, however, have been found insufficient or uneconomical in practice.

On the other hand, conventional squirrel-cage rotors with a soldered or injection-molded cage winding do not possess the virtual indestructibility of massive rotors; and machines with squirrel-cage rotors are not always sufficiently quiet in operation.

Attempts have further been made to avoid the shortcomings of the conventional cage-type rotors as well as those of the massive rotors. For this purpose a massive cylindrical rotor structure has been provided with electrically good conducting, non-magnetic rods of copper alternating with electrically conducting magnetic rods of iron and insulated therefrom by layers of insulating material inserted lengthwise between the rods, the axial ends of the rods being conductively connected with each other. This construction, constituting a commutator-type arrangement of conductors and insulation, is spacious, costly, of little mechanical stability because of the many copper rods which also considerably impair the magnetic utilization of the rotor. The alternate arrangement of iron and copper rods further increases the Carter factor and hence is detrimental to the power factor. In this rotor, neither the cylindrical magnetic yoke structure nor the rods around the periphery are cooled at the localities of greatest heat generation; and since the number of rods per pole is made so large as to thereby reduce magnetic noise, the magnetic utilization of the rotor is further reduced.

It is an object of my invention to eliminate the disadvantages of the known rotor types for asynchronous (induction) machines while retaining the advantages of the individual types of rotors.

This, according to the invention, is achieved in a particularly simple manner by providing the rotor with a ferromagnetic body or yoke and a number of ferromagnetic metal rods fixedly joined with the body and extending longitudinally thereof, the rods being distributed peripherally about the rotor body and being in electrically conducting connection with each other substantially only at their axial ends. The radial width of the ferromagnetic rods should correspond to the penetrating depth of the electromagnetic waves under the rated operating conditions and hence to a given torque-speed characteristic of the motor. Preferably, the radial width of the ferromagnetic rods is not appreciably larger than the just-mentioned penetrating depth.

While the rods are electrically insulated from each other along the axial length of their mutually adjacent longitudinal faces, such electrical insulation need extend only down to the just-mentioned penetrating depth and consequently over the predominant radial width of the rod lateral faces, whereas the radially inward sides of the rods need not be insulated from each other.

According to another feature of the invention, the ferromagnetic rods are rigidly joined with each other to form a cylindrical assembly which is joined as a whole with the magnetizable body or yoke structure of the rotor in such a manner that a rotation of the rotor body relative to the cylindrical assembly of rods is reliably prevented. For joining the rods to a cylindrical unit, the bottom (radially inward) sides of the rods may be welded together. However, these sides may also be welded to holder rings to be placed into grooves or slots of the rotor body.

Another way of assembling the ferromagnetic rods with the rotor body is to provide the rotor body with longitudinal slots or recesses and to place groups or packages of stacked rods into the respective recesses and secure the group against centrifugal forces. Such grooves or recesses may also be obtained by providing the rotor body with bridge members extending axially along the rotor body and protruding radially therefrom, the bridge members being distributed about the periphery to receive the stacks or packages of ferromagnetic rods between each other.

The rotor body or yoke structure may form a single piece in the axial direction. However, it may also be subdivided diametrically to facilitate fastening the ferromagnetic rods. In the latter case, the rods are preferably provided with projections or recesses engaging into corresponding recesses or projections of the rotor body components, so that the ferromagnetic rods are firmly held when the components of the rotor body are assembled and fastened together. Preferably, such means for holding the ferromagnetic rods in position are located at the axial ends of the respective rotor body components and are given swallow-tail or hook-shaped configuration. Another way of fastening the ferromagnetic rods between two components of the rotor body is to place rings between the axially aligned rotor body components and provide the inserted ring with a projection engaging corresponding recesses on the bottom sides of the rods in a twist-type latching engagement. Such subdivided rotor bodies may have their respective components provided with teeth at their mutually adjacent front side so that radial or rotational motion between the rotor body components is prevented once these components are coaxially fastened to each other.

Each component of a composite rotor body or each single-piece rotor body may also be composed of several co-axial cylindrical structures. Such a design is preferable, for example, if the rotor is made of rolled sheet material and must have such a large total thickness as cannot be readily produced as a single piece.

The rotor body or its coaxially aligned components may also be composed of massive segments which, when placed and attached together, rigidly fasten the ferromagnetic rods covering the respective cylindrically arcuate surfaces of the segments. The individual segments are then welded or otherwise rigidly joined with each other to form a single integral rotor structure.

According to another feature of my invention, the rotor is provided with longitudinal cooling channels in the vicinity of the ferromagnetic rods. Such cooling channels are readily formed when using a rotor body of hollow cylindrical shape and fastening it to the rotor shaft by radial connecting struts, spoke or bridge members. The individual components of the rotor body, mounted on the rotor shaft so as to be prevented from rotation relative thereto, should be capable of limited axial displacement if stresses due to thermal expansion are to be avoided. When providing venting or cooling channels in the vicinity of the rods, the flow of air can be divided by partitions or deflectors to respectively cool the rods and the rotor body in any desired manner.

It is preferable to insulate the ferromagnetic rods not only at their mutually adjacent longitudinal faces, but also from the ferromagnetic body of the rotor. This affords further reducing the transverse currents in rotors whose ferromagnetic rods have only a small radial height. For reducing detrimental upper harmonics, the rods may be arranged with an axial slope or inclination. For further reducing the upper harmonic wave unfavorably affecting the speed-torque characteristic, usually the third harmonic, it is in some cases advisable to subdivide the rods of the rotor into two axially aligned portions, or to subdivide the rotor body together with the appertaining half-portions of the rods, and to rigidly and conductively connect the mutually adjacent ends of the respective rod portions by an interposed center ring. In this case, the other ends of the rod portions are given a bevelled shape tapering toward the axis over a length substantially equal to the pole division of the disturbing upper harmonic. This further improves the starting and operating properties of the machine.

The ferromagnetic rods, made of such metal as dynamo sheet steel, may be cut from a material having a preferred magnetic orientation, for example cold-rolled sheet material, this orientation being in the direction of the height of the rods.

The above-mentioned and further features of the invention will be described more in detail with reference to the accompanying drawing, schematically showing various embodiments of rotors according to the invention by way of example.

Figure 1:
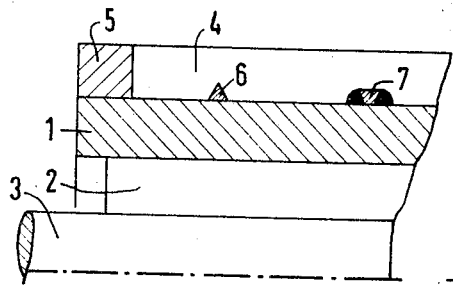
FIG. 1 is a partial sectional view, taken in an axial plane, of a first rotor
Figure 2:
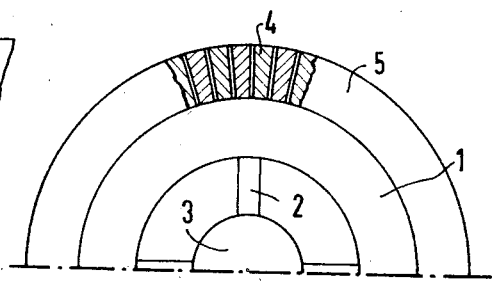
FIG. 2 is a lateral and partly cross-sectional view of the same rotor.

The rotor illustrated in FIGS. 1 and 2 comprises a massive cylindrical body 1 of ferromagnetic material which is firmly connected by a number of radial bridge members 2 with the rotor shaft 3 so as to be non-rotatable relative thereto. Arranged on the outer periphery of the cylindrical body 1 are ferromagnetic metal rods 4 which extend parallel to the rotor axis or in skewed relation thereto. The rods 4 are shown to have a substantially or accurately rectangular cross section. Their mutually adjacent lateral faces are insulated from each other either by a coating or insulating material or by being slightly spaced from each other. However, an insulation between the rods is not required at their radially inner sides where they may be in contact with each other.

At the two axial ends of the rotor assembly, the ferromagnetic rods 4 are in electrically good conducting connection with each other. For this purpose, they are joined with a good conducting ring 5. When giving the rods 4 a trapezoidal cross section and providing a thin insulating layer at least on the longitudinal faces, the rods can be placed tight against each other without gaps between their lateral faces. The insulation may consist of a thin oxide coating or of any other insulating material known for such purposes.

As shown in FIG. 1, the lower, radially inward sides of the rods are provided with recesses 6. This permits placing the rods 4 into a jig or the like holding device and welding the rods together by placing the weld into the recesses 6 so that the rods are rigidly joined together to form a cylindrical structure. Such a rigid connection of the individual rod is also obtainable by welding a ring 7 into a larger recess on the inward side of the rods, also as shown in FIG. 1. As a rule, the rotor is conventionally made axially longer than the not illustrated stator.

Figure 3:
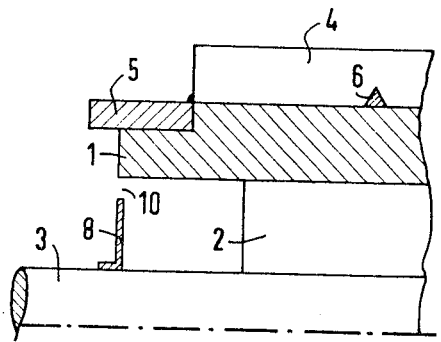
FIGS. 3 and 4 are schematic sectional views onto an axial plane and a radial plane respectively of a second embodiment.
Figure 4:
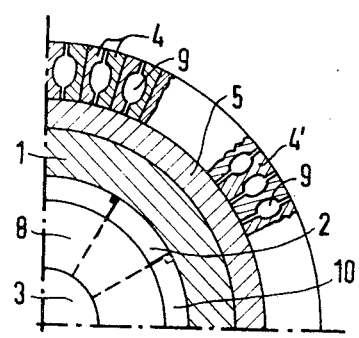

FIGS. 3 and 4 show a similar design of the rotor according to the invention which, however, provides for particularly good cooling of the rods at the localities of highest heat generation, and also for cooling the ferromagnetic yoke or body structure of the rotor. Distributed about the periphery of the cylindrical rotor body 1 of ferromagnetic metal are rods 4 and 4' which are joined to a rigid hollow-cylindrical assembly by welds placed into recesses 6 as described above with reference to FIG. 1. Each of the rods 4 and 4' has a longitudinal groove at one of its lateral sides so that an axially elongated cooling channel 9 is formed between each two adjacent rods 4 and 4'. The cross section and size of the cooling channel is so chosen that a sufficient quantity of cooling air will reach the localities of greatest heat generation, thus securing substantially uniform thermal stresses over the entire cross-section of the rod and thereby preventing excessive thermal tension.

The yoke or body 1 of the rotor, joined with the rotor shaft 3 by the above-mentioned radial connecting bridges 2, is likewise cooled by air passing through the interspaces between the bridges 2. To provide for a desired division of the axial flow of cooling air along to the rotor yoke 1 and the rods 4, 4', a ring-shaped baffle 8 consisting of one of several parts is mounted on the rotor shaft 3 to leave a given annular gap between the baffle and the inner side of the rotor yoke 1.

Figure 5:
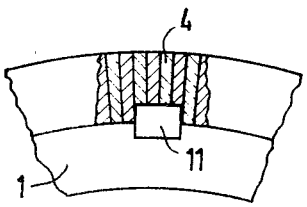
FIGS. 5 to 8 are partial cross-sectional view of four modified rotors.

The connection of the totality of rods 4, combined to a single structural unit as described above, with the rotor yoke 1, may be effected according to FIG. 5 by having a key 11 engaging a keyway in the surface of the rotor yoke 1 and centering into a slot formed by the bottom side of some of the rods.

Figure 6:
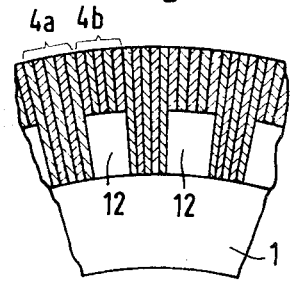
Figure 7:
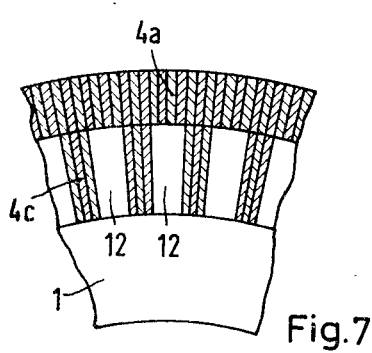

In the embodiment according to FIGS. 6 and 7, the cooling channels are located within the rod assembly. As shown in FIG. 6, the rods form different groups 4a and 4b of respectively different radial height, and the cooling channels 12 are formed between the inner sides of the shorter rods and the free lateral areas of the radially longer rods, the channels being inwardly closed by the surface of the rotor yoke 1. In the rotor shown in FIG. 7, the groups of rods 4a and 4c are arranged in two adjacent coaxial layers with the rods 4a of the outer layer surrounding the rods 4c of the inner layer. The rods 4c are arranged in peripherally spaced subgroups to form interstitial cooling channels 12 which are closed outwardly by the group of rods 4a and inwardly by the rotor body 1.

Figure 8:
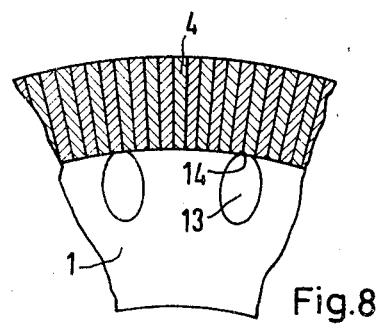

If, as shown in FIG. 8, the rotor has a drum-shaped or substantially full-cylindrical yoke structure 1, particularly of cast or axially laminated material, the cooling channels 13 may also be provided within the rotor yoke 1 and be outwardly closed by the rods 4. The cooling air passing through the channels 13 then reaches some of the rods in the immediate vicinity of the openings 14.

Figure 9:
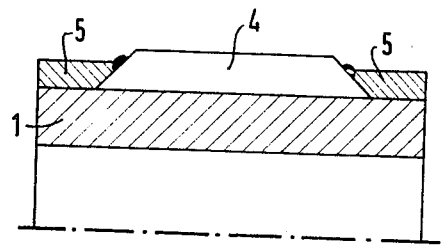
FIGS. 9 to 12 show four further embodiments by partial views upon respective axial planes.

FIG. 9 shows a preferred way of fastening the ferromagnetic rods 4, preferably joined with end rings 5 to form a rigid cylindrical assembly. In this embodiment, the ends of the rods 4 are bevelled and engage correspondingly hollow-conical recsses in the respective rings 5 to which the rods are welded along the outer periphery. The rings 5 are rigidly joined with the rotor body 1, so that the cylindrical assembly of rods 4 is rigidly secured to the rotor body without further fastening means, although such additional means may be provided if desired.

The rings in this as well as in the other embodiments may consist of the same ferromagnetic material as the rotor body 1. Such a design of the rotor exhibits particularly good starting properties as desired, for example, for on-off control, or switching operation. Similar operational characteristics are also obtainable with end rings of non-magnetic and electrically less conducting material than copper, for example rings of non-magnetic steel. A reduction of the starting currents, desirable for motors to perform on-off switching operations, can also be obtained without the use of end rings by welding the ends of the ferromagnetic rods to one another and, if desired, also to the massive rotor body to thereby obtain the electrically conducting connection.

For improving the continuous-run qualities, it is advantageous to employ end rings of non-magnetic and electrically good conducting material, such as copper. A further improvement of the continuous-operational qualities is obtainable by interposing a few electrically good conducting non-magnetic rods between the ferromagnetic rods in substantially uniform peripheral distribution, and connecting the interposed good conducting rods by non-magnetic electrically good conducting end rings which may be separate from the inter-connection of the ferromagnetic rods. In this manner there is provided a kind of auxiliary cage which, however, exhibits substantially good starting properties of a rotor according to the present invention. The rotor losses in continuous operation are thus reduced, thereby improving the efficiency. The rotor losses when starting can be increased by providing ferromagnetic rings concentrically upon the rings of non-magnetic material. This further improves the starting properties. The thickness of the ferromagnetic rings in the radial direction depends upon the penetrating depth of the electromagnetic waves and consequently upon the electrical rating of the machine. The double rings may be welded together with the rods to obtain a construction which permits an axial elongation under the effect of changes in temperature without angular displacement of the outer rotor portion relative to the yoke body 1.

The manufacture or assembling work can be facilitated by subdividing the rotor body in the peripheral as well as the axial direction, mounting the single-piece or multiple-piece yoke components coaxially beside each other on the rotor shaft. Such a design of the rotor body also facilitates attaching the ferromagnetic rods without the necessity of previously combining these rods to a rigid cylindrical body.

Figure 10:
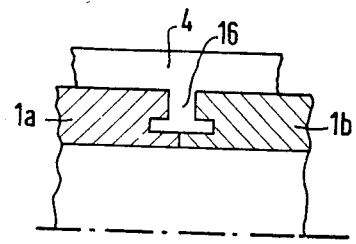
Figure 11:
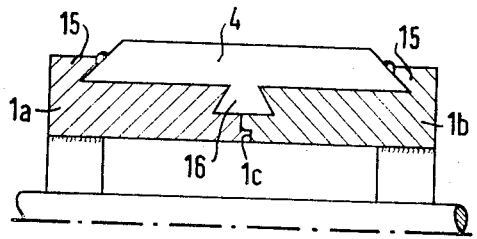
Figure 12:
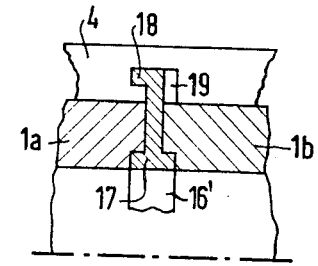
Figure 13:
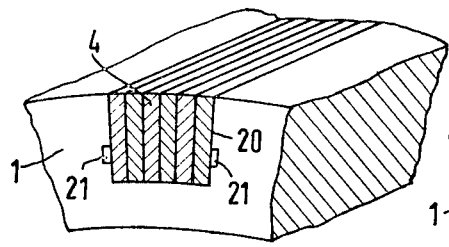
FIGURES 13 and 14 are schematic respective views and FIGS. 15 and 16 show details of two further embodiments.

Embodiments of the latter type are illustrated in FIGS. 10 to 12 of which FIGS. 10 and 12 show only the middle portion of the rotor. According to FIG. 10, each rod 4 has a hammer-head projection 16 engaging into correspondingly shaped recesses in the mutually adjacent annular end faces of two component rotor bodies 1a and 1b. When the component bodies are fastened together, the rods 4 are securely held in position against the effect of centrifugal force. With this embodiment, as well as those shown in FIGS. 11 and 12, it is possible to first attach the individual rods to only one of the component bodies 1a or 1b and to add the second component yoke body after all of the ferromagnetic rods 4 are thus attached. When thereafter the two yokes 1a and 1b are fastened to each other and to the rotor shaft, the entire rotor assembly inclusive of the ferromagnetic rods 4 is rigidly secured to the shaft so as to be prevented from rotating relative thereto while being axially displaceable to a limited extent. The ends of the rods are then fastened in the manner described above, for example with reference to FIG. 9. The two component bodies 1a and 1b are rigidly fastened with the aid of suitable bridge members which permit the rotor components to absorb thermal expansion in the axial direction. By subdividing and minimizing the longitudinal dimensions of the connecting bridge members, the weight of the rotor may be reduced, an expedient applicable with single-piece as well as composite rotor bodies.

In the embodiment shown in FIG. 11, each ferromagnetic rod 4 has a swallow-tail projection 16 at its bottom side which engages into a corresponding annular recess formed between the two component rotor bodies or yokes 1a and 1b. Furthermore, the two component yokes have their adjacent annular faces shaped to a stepped configuration so that they brace themselves against each other in the radial direction to provide a particularly stable assembly. The ends 15 of the component rotor bodies 1a and 1b have an undercut recess engaged by the slanting ends of the individually inserted rods 4 and are welded together therewith. Thus the annular portions of the yoke bodies which overlap the ends of the rods 4 correspond to the above-mentioned end rings. In this case, therefore, the end rings and the component bodies of the rotor consist of the same ferromagnetic material.

A further way of fastening the individually inserted rods 4 is shown in FIG. 12. Each ferromagnetic rod 4 has an angular recess 19 at the radially inward side in the middle of the rod. The recess 19 is engaged by a hook-shaped part 18 of a fastening ring 16'. The dimensions of the recess 19 and of part 18 are so matched that each rod can be fastened to the ring by a twisting action. The ring 16' has a hammer-head cross section at 17 which forms an annular shoulder engageable by respective annular recesses in the adjacent faces of the component rotor bodies 1a and 1b. When the component bodies are shoved and fastened together, the ring 16' and the rods 4 are rigidly secured in position against the effect of centrifugal force. In this case, too, a few individual ones of the ferromagnetic rods may be substituted by rods of non-magnetic electrically good conducting material distributed substantially uniformly about the periphery and, if desired, connected with each other by separate end rings of non-magnetic and electrically good conducting material to provide an auxiliary cage for continuous machine operation.

Such auxiliary rods of non-magnetic, electrically good conducting material may also be disposed in some of the air channels 9 according to FIG. 4 or also in air channels formed in some other manner, so that the outer cylindrical surface of the rotor does not possess any non-magnetic interposed areas.

For motors to exhibit good properties in continuous operation, the ferromagnetic rods are preferably made of a high-permeability metal having a highest feasible specific electrical resistance, a highest available saturation induction and a narrow hysteresis loop. By contrast, the properties of the material used for the rotor body or yoke generally have a lesser effect upon the operating properties of a motor equipped with the rotor according to the invention, provided the ferromagnetic rods cover the entire cylindrical surface of the rotor body. On the other hand, in cases where the rods are mounted, for example in groups, within correspondingly wide and relatively few slots or recesses of a massive rotor body, the choice of the ferromagnetic material for the rotor body itself may in some cases have an appreciable effect on the performance and in this case should substantially meet the above-mentioned properties of the ferromagnetic rods.

A rotor embodiment of the latter type is illustrated in FIGS. 13 to 16. According to FIG. 13, the ferromagnetic metal rods 4, forming a stack or package, are insulated from each other and placed into respective slots or recesses 20 of the rotor body 1 so that the narrow outer sides of the rods 4 are flush with the outer cylindrical surface of the body 1. The lateral walls of the recesses 20 have grooves 21 extending in the axial direction. Fastening rods (not illustrated) pass through openings 23 (FIG. 15) in the ferromagnetic rods 4 and protrude into the grooves 21 thus preventing the group of rods from radially dropping out of the recess after the group has been shoved from one axial end into the recess. The conducting connection of the groups with each other and, as the case may be, with the yoke body of the rotor may be effected in the manner described above in conjunction with the preceding embodiments.

Figure 14:
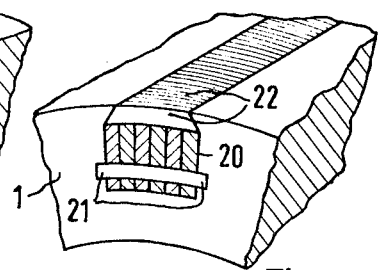
Figure 15:
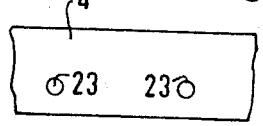

A similar way of accommodating the ferromagnetic rods in the rotor body is shown in FIG. 14. The recesses 20 in the rotor body 1 taper toward the outer periphery. The inserted package of rods does not extend into the tapered portion of the recess but stays below the cylindrical surface of the rotor. The remaining space is filled by axially laminated magnetizable sheet-metal pieces 22 so that the completed assembly has a substantially smooth and uninterrupted cylindrical outer surface. The axial lamination has the further advantage that upper harmonic currents are reduced or virtually suppressed at least in the vicinity of the recesses.

Figure 16:
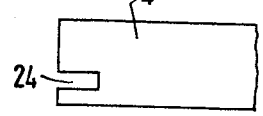

For fastening the rod package, the individual rods are provided according to FIG. 16 with a lateral recess 24 at each axial end, and transverse latches are inserted into the recesses so as to protrude into the above-mentioned grooves 21 (FIG. 14). In this manner the package of ferromagnetic rods is reliably secured in the radial and axial directions. The transverse recesses also reduce the upper harmonic currents, an effect known as such.

Figure 17:
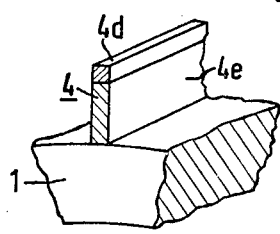
FIG. 17 illustrates in schemetic perspective a modified detail.

A reduction of the upper harmonic currents is also attainable by a design of the individual rods 4 as exemplified in FIG. 17. Each ferromagnetic rod 4 consists in its radially outer portion 4d of a material or metallurgical structure having a higher specific electrical resistance than the remaining portion 4e, both portions being integral to form a single unitary body. The fastening of these rods is in accordance with any of the other embodiments described in this specification.

Figure 18:
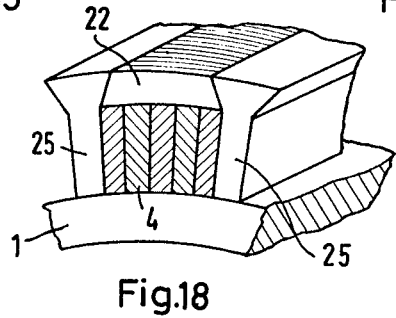
FIGS. 18, 19 and 20 show schematically perspective thre further bodies of rotors according to the invention.
Figure 19:
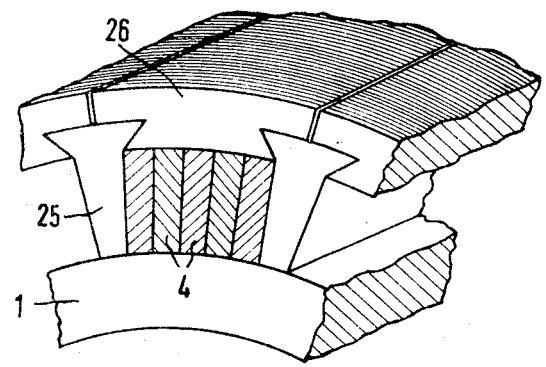

The groupwise arrangement of the ferromagnetic rods may also be given a design as shown in FIGS. 18 and 19. According to FIG. 18, a number of radial bridge members 25, extending in the axial direction, are fastened to the rotor body 1 at the outer periphery thereof. Each of the bridge members 25 has a flaring outer end portion so that each two radial bridge members form between each other a recess for accommodating a package or stack of ferromagnetic rods 4. The rods 4 do not extend into the tapering portion of the recess which is filled by a cover of axially laminated sheet-metal pieces 22 of ferromagnetic material. In an embodiment of this type, the choice of material for the rotor yoke 1 is less significant than with a rotor design as shown in FIG. 14, for example. The reduction of the upper harmonic current in the axial direction occurs only in the vicinity of the recesses, namely in the vicinity of the cover laminations 22 according to FIG. 18.

A virtually complete suppression of the upper harmonic currents on the entire rotor cylindrical surface is obtained with an embodiment as shown in FIG. 19. In this case the cover laminations 26 extend peripherally over the top of each radial bridge member 25, and the cover laminations of adjacent recesses follow each other so closely as to virtually form a smooth axially laminated surface.

In embodiments of the kind described with reference to FIGS. 13 to 19, the rotor body may be composed of two or more components in the manner already described, and their venting channels for cooling purposes may be formed between the ferromagnetic rods, also as explained above. A simplification in construction and a reduction in manufacturing cost is applicable particularly in those cases where the material and design of the rotor yoke are of minor significance to the total operational properties of the rotor. Thus, for example the yoke body may be composed of massive segments, particularly in large machines. Such a massive segment is schematically shown at 27 in FIG. 20. The segment carries the ferromagnetic rods 4 which, for example are welded together at their axial ends and are also welded to the segment 27 at the same location 28 so that the entire arrangement constitutes a single-piece subassembly. The subassemblies that are to be placed together to form a complete rotor may then be welded together at the axial end sides of the segments 27. The segments may also be given such a shape that the resulting rotor assembly is shaped as a cylindrical roller. As a matter of fact, the design of the rotor body is not limited to the hollow cylindrical shapes illustrated. With drum-shaped rotor bodies, particularly if they consist of castings, the cooling channels may be formed in the casting and the connecting bridge members may also form part of the same casting to permit mounting the rotor body on the shaft in the manner described above.

Figure 20:
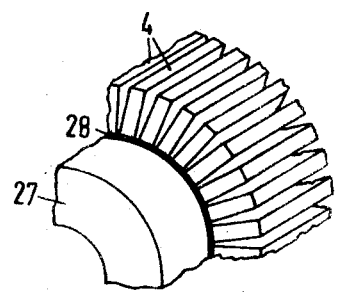

In cases where the rotor is composed of axially aligned components, the individual components may each consist of segments according to FIG. 20. The rotor yoke or each of its component bodies may consist of cylindrical drum-shaped single-piece or composite structures, or they may also be formed in known manner of laminated hollow cylinders or drums. A rotor-yoke construction whose properties can readily be varied is obtained by forming the yoke body or its components as a hollow cylinder or hollow ring and filling it with ferromagnetic material, for example iron powder in loose constitution or cemented together by a suitable adhesive.

For obtaining a machine characteristic which combines good starting properties with good continuous running properties, and in accordance with a further feature of my invention, care may be taken that the end connection between the ferromagnetic rods is controlled during starting operation to secure high starting torques with relatively low currents, whereas when a given speed is reached, the resistance values of the end connection between the rods is reduced for increasing the rotor currents. For this purpose, non-magnetic and electrically good conducting end rings may be provided and controlled in dependence upon speed so as to be placed into electrically conducting contact with the ferromagnetic rods only after a given speed is reached. Such control means may consist of centrifugal switches, for example.

By virtue of the invention, the losses in the stator winding during starting-up and braking performance are kept low (low current intensities) in cases where it is desired to provide machines for on-off switching operation. Due to the good cooling of the rods at the heat-generating localities and due to the cooling of the rotor yoke and the good heat conductance of rotors according to the invention, machines equipped with such rotors are reliably applicable not only for switching operations, but also for flywheel mass drives, as well as for continuous performance, and consequently for virtually all occurring conditions of operation. Since with rotors of the invention the Carter factor $Kc_2$ can be kept close to its ideal value 1, and since the traverse currents and upper harmonic currents can be minimized or suppressed by the above-described means, the invention permits producing machines that combine a high degree of efficiency and a high power factor with a relatively low volumetric weight of the machine.

In addition, such machines are rugged and simple in construction, economically applicable and largely protected from damage. In general, the quality factor of starting performance is better than that of the more sensitive and more expensive machines with laminated squirrel-cage rotors.

For further modifying the operational properties of machines with rotors according to the invention, at least one insulated alternating-current winding may be arranged in the rotor portion formed by the ferromagnetic rods. The alternating-current winding or windings may either be connected with each other to form a closed electric circuit, or they may be switched together by controllable switching means. This permits obtaining a control of the speed-torque characteristic in such a manner as to secure an increased standstill (starting) torque. Thus, without necessarily providing additional resistors in the rotor circuit, a good starting quality may be achieved in no-load, as well as in load operation of the machine.

By starting the machine with an open or only partially closed alternating-current winding, the starting current can be correspondingly limited. By connecting the alternating-current winding or windings to slip rings, a cascade connection with other alternating-current machines of the same or conventional types can be set up, and the efficiency of such a machine set in continuous performance can be considerably improved. The reduction of the rotor losses by virtue of the added alternating-current winding also results in decreasing the slip so that the dependence of the machine speed upon the load becomes smaller than that of conventional machines with laminated rotors. Due to the greater amount of stray of a rotor according to the invention, in comparison with conventional laminated rotors, the effective number of winding turns in the stator, as well as the slot cross sections of the stator can be kept smaller so that it becomes possible to reduce the quantity of copper required in the stator and rotor, in comparison with conventional machines, without affecting the efficiency.

When switching the windings together with each other and/or for connecting the windings to slip rings, it is preferable in some cases to provide speed-responsive switching devices, especially in cases where a particularly good starting behavior and a particularly favorable continuous-run performance are desired.

If the rotor is employed in a synchronous machine, an insulated excitation winding, in lieu of an insulated alternating-current winding, may be provided in the rotor portion formed by the ferromagnetic rods, particularly in the cooling channels for these rods. The separate damper windings with which known synchronous-machine rotors are usually equipped, are dispensible, since the rods form a damper winding by themselves or in conjunction with the good conducting end rings. The avoidance of separate damper windings in such cases gains space for providing the excitation winding, so that the machines, for given dimensions, are applicable for a higher power rating.

Upon a study of this disclosure, it will be obvious to those skilled in the art that my invention is amenable to a great variety of modifications and may be given embodiments other than those particularly illustrated and described herein, without departing from the essential features of my invention and within the scope of the claims annexed hereto.

I claim:

1. A rotor for an alternating current machine, comprising a ferromagnetic rotor body and ferromagnetic metal rods fixedly joined with said body and extending longitudinally thereof, said ferromagnetic rods being distributed peripherally of said body and being in electrically conducting connection with each other at their axial ends, said ferromagnetic rods being electrically insulated from each other along the length of their mutually adjacent longitudinal sides and from the outer periphery down substantially to the radially inward side.

2. A rotor for an alternating current machine, comprising a ferromagnetic rotor body and ferromagnetic metal rods fixedly joined with said body and extending longitudinally thereof, said ferromagnetic rods being distributed peripherally of said body and being in electrically conducting connection with each other at their axial ends, said ferromagnetic rods consisting of material having a preferred magnetic orientation in the radial rection.

3. A rotor for an alternating current machine, comprising a ferromagnetic rotor body and ferromagnetic metal rods fixedly joined with said body and extending longitudinally thereof, said ferromagnetic rods being distributed peripherally of said body and being in electrically conducting connection with each other at their axial ends, said ferromagnetic rods forming a plurality of coaxially adjacent layers, the rods in different ones of said layers having respectively different magnetic properties.

4. A rotor for an alternating current machine, comprising a ferromagnetic rotor body and ferromagnetic metal rods fixedly joined with said body and extending longitudinally thereof, said ferromagnetic rods being distributed peripherally of said body and being in electrically conducting connection with each other at their axial ends, some of said ferromagnetic rods, small in number compared with that of the remaining ferromagnetic rods, being replaced by rods of non-magnetic electrically conducting material, said non-magnetic rods being uniformly distributed peripherally between said ferromagnetic rods and having their respective axial ends at each axial end side of the rotor in electrically good connection with each other.

5. A rotor for an alternating current machine, comprising a ferromagnetic rotor body and ferromagnetic metal rods fixedly joined with said body and extending longitudinally thereof, said ferromagnetic rods being distributed peripherally of said body and being in electrically conducting connection with each other at their axial ends, said ferromagnetic rods having fastening means at their radially inward sides, said fastening means being engageable with said rotor body for individually attaching said rods thereto.

6. A rotor for an alternating current machine, comprising a ferromagnetic rotor body having a plurality of radially laminated ferromagnetic cylinders coaxially adjacent to each other and ferromagnetic metal rods fixedly joined with said body and extending longitudinally thereof, said ferromagnetic rods being distributed peripherally of said body and being in electrically conducting connection with each other at their axial ends, said ferromagnetic rods being electrically insulated from each other along the length of their mutually adjacent longitudinal sides and from the outer periphery down substantially to the radially inward side.

7. A rotor for an alternating current machine, comprising a ferromagnetic rotor body and ferromagnetic metal rods fixedly joined with said body and extending longitudinally thereof, said ferromagnetic rods being distributed peripherally of said body and being in electrically conducting connection with each other at their axial ends, said ferromagnetic rods being approximately trapezoidal in cross-section and having a smaller spatial expansion in tangential direction than in radial direction whereby the ratio of tangential thickness to radial thickness determines the radial depth of penetration of electromagnetic waves and the magnitude of resistivity and thereby determines the speed-torque characteristic of said machine, and a plurality of non-magnetic electrically conducting rods uniformly peripherally positioned parallel to said ferromagnetic rods to provide a smooth rotor surface and to prevent tangentially directed currents, said nonmagnetic rods being fewer in number than said ferromagnetic rods and being conductively interconnected at their axial ends.

8. A rotor for an alternating current machine comprising a ferromagnetic rotor body and ferromagnetic electrically conducting rods fixedly joined with said body and providing a smooth rotor surface and preventing currents in tangential direction, said ferromagnetic rods being in electrically conducting connection with each other at their axial ends, said ferromagnetic rods being approximately trapezoidal in cross-section and having a considerably smaller spatial expansion in tangential direction than in radial direction.

9. A rotor as claimed in claim 8, further comprising cooling channels extending in directions substantially parallel to the axis of said rotor body adjacent to said ferromagnetic rods for cooling said rods at areas of the highest thermal stress.

10. A rotor as claimed in claim 8, further comprising open cooling channels in said rotor adjacent to said ferromagnetic rods and covered by the radially inner sides of said rods.

11. A rotor as claimed in claim 8, further comprising cooling channels extending in directions substantially parallel to the axis of said rotor body adjacent to said ferromagnetic rods for cooling said rods at areas of the highest thermal stress, said rods having in groups alternately varying radii and said cooling channels being covered by the free radial sides of said rods and the uncovered periphery of said rotor body.

12. A rotor as claimed in claim 8, wherein said rods are arranged in a plurality of radially stacked layers.

13. A rotor as claimed in claim 8, wherein said rods are arranged in a plurality of radially stacked layers, the rods of different layers having different cross-sections.

14. A rotor as claimed in claim 8, wherein said rods have a thin insulating coating on at least the mutually adjacent side faces.

15. A rotor as claimed in claim 8, further comprising cooling channels extending in directions substantially parallel to the axis of said rotor body adjacent to said ferromagnetic rods for cooling said rods at areas of the highest thermal stress, and rods of non-magnetic electrically conducting material conductively interconnected at their axial ends, each of said non-magnetic rods being located in corresponding ones of said channels.

16. A rotor as claimed in claim 8, wherein said ferromagnetic rods have their axial ends welded to said rotor body.

17. A rotor as claimed in claim 8, wherein said ferromagnetic rods have at their radially outward side a higher specific resistance than at their radially inward side.

18. A rotor as claimed in claim 8, wherein said rotor body has longitudinal recesses distributed about the periphery and said ferromagnetic rods are mounted in said recesses, and further comprising a radially laminated cold-rolled sheet metal cover on said rods, said rods and the laminations of said cover comprising material having a preferred magnetic orientation in the radial direction.

19. A rotor as claimed in claim 8, wherein said rotor body has at least one insulated winding positioned in the area formed by said rods.

References Cited

UNITED STATES PATENTS

| | | | |
|---|---|---|---|
| 427,978 | 5/1890 | Von Dolivo-Dobrowolsky | 310—211 |
| 1,375,007 | 4/1921 | Kimble | 310—211 |
| 1,375,461 | 4/1921 | Kimble | 310—211 |
| 1,708,909 | 4/1929 | Spencer | 310—212 |
| 2,857,539 | 10/1958 | Limpel | 310—211 |
| 3,263,106 | 8/1966 | Divers | 310—54 |

MILTON O. HIRSHFIELD, Primary Examiner

L. L. SMITH, Assistant Examiner

U.S. Cl. X.R.

310—61